(12) United States Patent
Lee et al.

(10) Patent No.: US 12,732,964 B2
(45) Date of Patent: Sep. 8, 2026

(54) BASE STATION DEVICE AND OPERATING METHOD THEREOF IN WIRELESS COMMUNICATION SYSTEM

(71) Applicant: SAMSUNG ELECTRONICS CO., LTD., Suwon-si (KR)

(72) Inventors: Sunyoung Lee, Suwon-si (KR); Jinho Kim, Suwon-si (KR); Hongsik Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 695 days.

(21) Appl. No.: 18/097,667

(22) Filed: Jan. 17, 2023

(65) Prior Publication Data

US 2023/0232372 A1 Jul. 20, 2023

(30) Foreign Application Priority Data

Jan. 18, 2022 (KR) ........................ 10-2022-0007450
Jul. 6, 2022 (KR) ........................ 10-2022-0083159

(51) Int. Cl.

*H04W 72/02* (2009.01)
*H04L 5/00* (2006.01)
*H04W 72/541* (2023.01)

(52) U.S. Cl.

CPC ........... *H04W 72/02* (2013.01); *H04L 5/0051* (2013.01); *H04W 72/541* (2023.01)

(58) Field of Classification Search

CPC .... H04W 72/02; H04W 72/541; H04L 5/0051
See application file for complete search history.

(56) References Cited

U.S. PATENT DOCUMENTS

| | | | | |
|---|---|---|---|---|
| 10,257,744 | B2 * | 4/2019 | Kim | H04B 17/345 |
| 10,348,432 | B2 | 7/2019 | Chen et al. | |
| 10,727,996 | B2 | 7/2020 | Nam et al. | |
| 10,999,027 | B2 | 5/2021 | Tang | |
| 11,057,925 | B2 | 7/2021 | Babaei et al. | |
| 11,121,792 | B2 * | 9/2021 | Kim | H04W 72/23 |
| 11,159,916 | B2 | 10/2021 | Yamada et al. | |
| 2016/0234853 | A1 | 8/2016 | Yang et al. | |
| 2016/0344575 | A1 | 11/2016 | Gong et al. | |
| 2020/0274668 | A1 | 8/2020 | Yamada et al. | |

OTHER PUBLICATIONS

"ETSI TS 138 331," Technical Specification, 5G; NR; Radio Resource Control (RRC); Protocol specification (3GPP TS 38.331 version 16.6.0 Release 16), Oct. 2021, Total 948 pages.

(Continued)

*Primary Examiner* — Ayaz R Sheikh
(74) *Attorney, Agent, or Firm* — Sughrue Mion, PLLC

(57) ABSTRACT

A base station device includes a communication circuit configured to receive a first signal from an external base station device and transmit a second signal to a user equipment, by using a plurality of antennas, and a processor configured to obtain resource allocation information of the external base station device based on the first signal, identify whether an interference cell occurs, and generate the second signal when the interference cell occurs, the second information including resource allocation information of the interference cell.

18 Claims, 9 Drawing Sheets

(56) References Cited

OTHER PUBLICATIONS

"ETSI TS 138 211," Technical Specification, 5G; NR; Physical channels and modulation (3GPP TS 38.211 version 16.7.0 Release 16), Oct. 2021, Total 138 pages.
"ETSI TS 138 212," Technical Specification, 5G; NR; Multiplexing and channel coding (3GPP TS 38.212 version 16.7.0 Release 16), Oct. 2021, Total 157 pages.
"ETSI TS 138 213," Technical Specification, 5G; NR; Physical layer procedures for control (3GPP TS 38.213 version 16.7.0 Release 16), Oct. 2021, Total 191 pages.
"ETSI TS 138 214," Technical Specification, 5G; NR; Physical layer procedures for data (3GPP TS 38.214 version 16.7.0 Release 16), Oct. 2021, Total 176 pages.
Communication issued on Jun. 13, 2023 by the European Patent Office for European Patent Application No. 22214416.4.

* cited by examiner

BASE STATION DEVICE AND OPERATING METHOD THEREOF IN WIRELESS COMMUNICATION SYSTEM

CROSS-REFERENCE TO RELATED APPLICATIONS

This application is based on and claims priority under 35 U.S.C. § 119 to Korean Patent Application No. 10-2022-0007450, filed on Jan. 18, 2022 and Korean Patent Application No 10-2022-0083159, filed on Jul. 6, 2022, in the Korean Intellectual Property Office, the disclosures of which are incorporated by reference herein in their entirety.

BACKGROUND

1. Field

The disclosure relates to a base station device and an operating method thereof in a wireless communication system, and more particularly, to a base station device for alleviating the influence of an interference signal and an operating method of the base station device.

2. Description of Related Art

With the recent rapid development of wired and wireless communication technologies and technologies related to smart devices, there is an increasing need for a communication device that increases transmission and reception performance by reducing the influence of interference on a signal such that reliable communication may be carried out among base station devices, external devices, and/or user devices in a wireless communication system.

For example, since information is generally minimal about the cause, origin or location of occurrence of interference, it is difficult to directly remove the interference. When a batch process is applied to the whole band of a reception signal in a user equipment to remove interference, the data reception performance of the user equipment may decrease because of signal distortion.

Therefore, there is a need for a base station device for inducing effective interference removal by providing resource allocation information of an interference cell to a user equipment in a wireless communication system and accurately informing the user equipment of an occurrence region of interference through the resource allocation information of the interference cell.

SUMMARY

According to an aspect of the disclosure, there is provided a base station device for inducing a user equipment to effectively remove interference by providing resource allocation information of an interference cell to the user equipment in a wireless communication system.

According to another aspect of the disclosure, there is provided an operating method of a base station device for inducing a user equipment to effectively remove interference by providing resource allocation information of an interference cell to the user equipment in a wireless communication system.

The disclosure is not limited to what is mentioned above and will be clearly understood by those skilled in the art from the descriptions below.

According to an aspect of the disclosure, there is provided a base station device including: a communication circuit configured to: receive a first signal from an external base station device, and transmit a second signal to a user equipment, by using a plurality of antennas; and a processor configured to: obtain resource allocation information of the external base station device based on the first signal, identify, based on the resource allocation information of the external base station device, whether an interference cell is present, and generate the second signal based on identifying that the interference cell is present, the second signal including resource allocation information of the interference cell.

The processor may be further configured to: identify whether a rate of overlap between a first resource allocated to the interference cell and a second resource allocated to a serving cell of the base station device is greater than or equal to a threshold value, based on resource allocation information of the serving cell; and transmit the second signal to the user equipment when the rate of overlap between the first resource and the second resource is greater than or equal to the threshold value.

The processor may be further configured to receive the first signal including the resource allocation information of the interference cell of the external base station device by using a backhaul link between the base station device and the external base station device.

An interference signal of the interference cell may include at least one of a signal transmitted based on a physical downlink shared channel (PDSCH), a synchronization signal block (SSB) signal, or a channel state information-reference signal (CSI-RS).

The processor may be further configured to generate the second signal, based on resource allocation information regarding the signal transmitted based on the PDSCH of the interference cell, and wherein the resource allocation information regarding the signal transmitted based on the PDSCH of the interference cell includes information about a slot offset of the PDSCH of the interference cell, a length of a symbol, a resource allocation type, a resource block group (RBG) size, and a frequency domain resource assignment bitmap.

The processor may be further configured to generate the second signal, based on resource allocation information regarding the SSB signal of the interference cell, and wherein the resource allocation information regarding the SSB signal of the interference cell includes information about periodicity of the SSB signal of the interference cell, a bitmap in a half frame, a frequency band used by the SSB signal based on an absolute frequency, and a subcarrier spacing.

The processor may be further configured to generate the second signal, based on resource allocation information regarding the CSI-RS of the interference cell, and wherein the resource allocation information regarding the CSI-RS of the interference cell includes information about a slot offset of the CSI-RS of the interference cell, a start symbol and length, a start resource block and length, a code division multiplexing mode, and a frequency bitmap.

The processor may be further configured to generate the second signal by including the resource allocation information of the interference cell in radio resource control (RRC) or downlink control information (DCI).

According to another aspect of the disclosure, there is provided an operating method of a base station device, the operating method including: receiving a first signal from an external base station device by using a plurality of antennas; obtaining resource allocation information of the external base station device based on the first signal; identifying, based on the resource allocation information of the external base station device, whether an interference cell is present; generating a second signal based on identifying that the interference cell is present, the second signal including resource allocation information of the interference cell and transmitting the second signal to a user equipment.

The operating method may further include identifying whether a rate of overlap between a first resource allocated to the interference cell and a second resource allocated to a serving cell of the base station device is greater than or equal to a threshold value, based on resource allocation information of the serving cell; and transmitting the second signal to the user equipment when the rate of overlap between the first resource and the second resource is greater than or equal to the threshold value.

The receiving of the first signal may include receiving the first signal including the resource allocation information of the interference cell of the external base station device by using a backhaul link between the base station device and the external base station device.

An interference signal of the interference cell may include at least one of a signal transmitted based on a physical downlink shared channel (PDSCH), a synchronization signal block (SSB) signal, or a channel state information-reference signal (CSI-RS).

The generating of the second signal may include generating the second signal, based on resource allocation information regarding a signal transmitted based on the PDSCH of the interference cell, and wherein the resource allocation information regarding the signal transmitted based on the PDSCH of the interference cell includes information about a slot offset of the PDSCH of the interference cell, a length of a symbol, a resource allocation type, a resource block group (RBG) size, and a frequency domain resource assignment bitmap.

The generating of the second signal may include generating the second signal, based on resource allocation information regarding the SSB signal of the interference cell, and wherein the resource allocation information regarding the SSB signal of the interference cell includes information about periodicity of the SSB signal of the interference cell, a bitmap in a half frame, a frequency band used by the SSB signal based on an absolute frequency, and a subcarrier spacing.

The generating of the second signal may include generating the second signal, based on resource allocation information regarding the CSI-RS of the interference cell, and wherein the resource allocation information regarding the CSI-RS of the interference cell includes information about a slot offset of the CSI-RS of the interference cell, a start symbol and length, a start resource block and length, a code division multiplexing mode, and a frequency bitmap.

The generating of the second signal may include generating the second signal by including the resource allocation information of the interference cell in radio resource control (RRC) or downlink control information (DCI).

According to another aspect of the disclosure, there is provided a base station device including: a communication circuit configured to: receive a first signal from an external base station device, and transmit a second signal to a user equipment, by using a plurality of antennas; and a processor configured to: obtain resource allocation information of the external base station device based on the first signal, identify whether there is resource overlap between a demodulation-reference signal (DM-RS) of a serving cell of the base station device and a signal of the external base station device, and generate the second signal based on identifying that there is the resource overlap between the DM-RS of the serving cell of the base station device and the signal of the external base station device, the second signal including information about an overlapping resource between the DM-RS and the signal of the external base station device.

The processor may be further configured to receive the first signal including the resource allocation information of the external base station device by using a backhaul link between the base station device and the external base station device.

The signal of the external base station device may include a signal transmitted from an interference cell of the external base station device, based on a physical downlink shared channel (PDSCH), wherein the processor is further configured to generate the second signal, based on information about a resource allocated to the DM-RS among resource allocation information regarding the PDSCH of the interference cell, and wherein the resource allocation information regarding the PDSCH includes information about a symbol overlapping with the DM-RS in a region of the PDSCH.

The processor may be further configured to generate the second signal by including the information about the overlapping resource between the DM-RS and the signal of the external base station device in radio resource control (RRC) or downlink control information (DCI).

According to another aspect of the disclosure, there is provided a base station including: a memory storing one or more instructions; and a processor configured to execute the one or more instructions to: obtain resource allocation information corresponding to a first external device, identify, based on the resource allocation information corresponding to the first external device, whether interference to a serving cell of the base station exists, and generate a signal including resource information corresponding to the interference; and transmit the signal to a second external device.

The first external device may be an external base station.

The second external device may be a user equipment.

The processor may be further configured to identify whether the interference to the serving cell of the base station exists by identifying whether there is resource overlap between a demodulation-reference signal (DM-RS) of the serving cell of the base station and a signal of the first external device.

BRIEF DESCRIPTION OF DRAWINGS

Embodiments will be more clearly understood from the following detailed description taken in conjunction with the accompanying drawings in which.

DETAILED DESCRIPTION OF EMBODIMENTS

Hereinafter, embodiments are described in detail with reference to the accompanying drawings.

For convenience of description, some of the terms and names defined in the 3rd Generation Partnership Project long term evolution (3GPP LTE) standard or the new radio (NR) standard are used herein. However, the disclosure is not limited to those terms and names and may also be applied to systems complying with other standards.

According to an example embodiment, a base station device may refer to a fixed station communicating with a user equipment and/or another base station. For example, the base station device may be referred to as a node B, an evolved-node B (eNB), a sector, a site, a base transceiver system (BTS), an access point (AP), a relay node, a remote radio head (RRH), or a radio unit (RU).

According to an example embodiment, a user equipment may be referred to as, for example, a user equipment (UE), a mobile station (MB), a mobile terminal (MT), a user terminal, a subscriber station (SS), a wireless device, or a handheld device.

Figure 1:
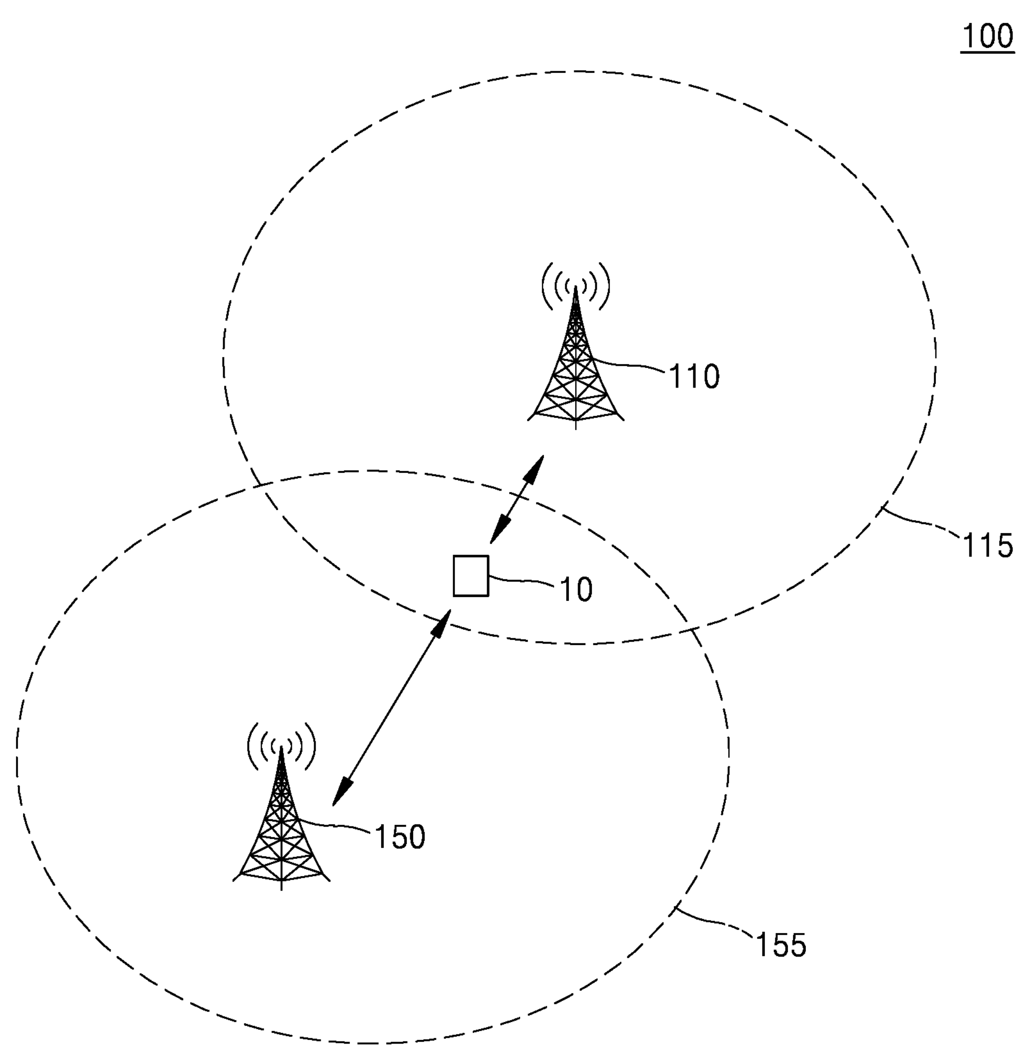
FIG. 1 illustrates an example of a wireless communication system according to an example embodiment.

FIG. 1 illustrates an example 100 of a wireless communication system according to an example embodiment.

Referring to FIG. 1, the wireless communication system may include a base station device 110, an external base station device 150, and a UE 10. Although FIG. 1 only illustrates two base stations (e.g., base station 110 and external base station 150), the disclosure is not limited thereto, and as such, a plurality of base stations may be included in the wireless communication system.

According to an example embodiment, the wireless communication system may include an NR system, a 5th generation (5G) system, an LTE system, a code division multiple access (CDMA) system, a global system for mobile communications (GSM) system, a wireless local area network (WLAN) system, or another random wireless communication system. Hereinafter, it is assumed that a wireless communication system is an NR system, an LTE system, or a system that may support NR- and LTE-based communication, but the disclosure is not limited thereto.

The base station device 110 and the external base station device 150 may support 4th generation (4G) communication (e.g., LTE or LTE-advanced (LTE-A)), 5G communication (e.g., NR), and/or the like, which are defined in the 3GPP standard.

For example, for 4G communication and 5G communication, the base station device 110 and the external base station device 150 may support a CDMA-based communication protocol, a wideband CDMA (WCDMA)-based communication protocol, a time division multiple access (TDMA)-based communication protocol, a frequency division multiple access (FDMA)-based communication protocol, an orthogonal frequency division multiplexing (OFDM)-based communication protocol, a cyclic prefix (CP)-OFDM-based communication protocol, a discrete Fourier transform-spread-OFDM (DFT-s-OFDM)-based communication protocol, a non-orthogonal multiple access (NOMA)-based communication protocol, a generalized frequency division multiplexing (GFDM)-based communication protocol, and the like.

In the wireless communication system, the base station device 110 and the external base station device 150 may include at least one cell as a minimum unit of an area, in which each of the base station device 110 and the external base station device 150 provides communication services. The base station device 110 and the external base station device 150 may provide efficient multiple access communication for a plurality of UEs, based on a particular frequency resource allocated to each cell. At this time, as cell specific information, resource allocation information of each cell may be the same as or different from that of an adjacent cell.

The UE 10 may select a cell, in which the strength of a reception signal is the largest, and register the cell as a serving cell and thus access a base station device, which includes the serving cell, through random access.

At this time, it is assumed that a cell of the base station device 110 is a serving cell 115 of the UE 10 and a cell of the external base station device 150 is an interference cell 155. The interference cell 155 is adjacent to the serving cell 115. It is assumed that resources allocated to the serving cell 115 overlap with resources allocated to the interference cell 155.

According to an example embodiment, the UE 10 may receive radio resource control (RRC) and downlink control information (DCI) from the base station device 110 including the serving cell 115 and obtain resource allocation information regarding physical channels and physical signals of the base station device 110. According to an example embodiment, the physical channels may include a physical downlink shared channel (PDSCH) and a physical downlink control channel (PDCCH), and the physical signals may include a demodulation reference signal (DMRS), a channel status information-reference signal (CSI-RS), a primary synchronization signal (PSS), and a secondary synchronization signal (SSS). However, the disclosure is not limited to the example physical channels and physical signals discussed above. The UE 10 may perform wireless communication with the base station device 110, based on the resource allocation information of the serving cell 115.

However, in the case where resources allocated to the serving cell 115 overlap with resources allocated to the interference cell 155, when the UE 10 receives a signal from the serving cell 115, the wireless communication performance of the UE 10 may be degraded because of an interference signal (e.g., a PDSCH, a synchronization signal block (SSB), or a CSI-RS) received from the interference cell 155.

However, since the UE 10 may not accurately locate an interference signal of the interference cell 155 in a wireless communication resource domain, it is difficult to directly remove an interference signal of the interference cell 155.

For example, when the UE 10 applies an interference removal process (e.g., a whitening filtering process) to all the received data to remove an interference signal of the interference cell 155, the received data may be distorted because of removal of interference in a lump sum manner, and accordingly, the data reception performance of the UE 10 may be degraded.

Accordingly, an example embodiment provides a base station device for assisting or inducing a UE to effectively remove interference by providing the occurrence region of an interference signal to the UE, based on resource allocation information of an interference cell in a wireless communication system, and an operating method of the base station device.

Figure 2:
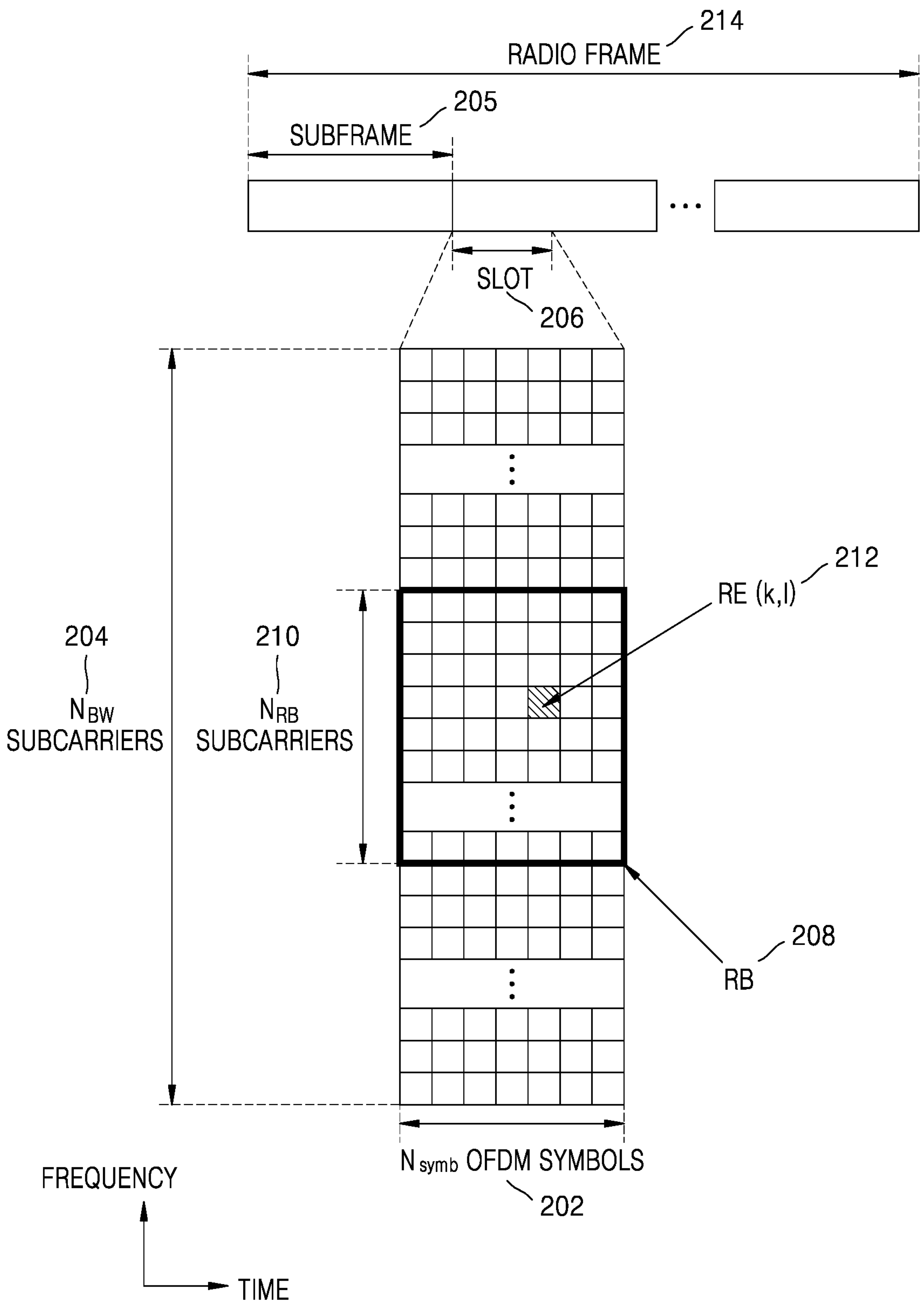
FIG. 2 is a diagram of the basic structure of a time-frequency resource domain of a wireless communication system, according to an example embodiment.

FIG. 2 is a diagram of the basic structure of a time-frequency resource domain of a wireless communication system, according to an example embodiment.

Referring to FIG. 2, the horizontal axis may be a time domain and the vertical axis may be a frequency domain. A minimum transmission unit in the time domain is an OFDM symbol, and $N_{symb}$ OFDM symbols 202 may constitute a single slot 206. N (e.g., two) slots may constitute a single subframe 205. For example, the length of the slot 206 may be 0.5 ms, and the length of the subframe 205 may be 1.0 ms. A radio frame 214 may correspond to a time-domain unit constituted of ten subframes 205. A subframe 205 may correspond to a single transmission time interval (TTI).

A minimum transmission unit in the frequency domain is a subcarrier, and a total system transmission bandwidth may include $N_{BW}$ subcarriers 204. A resource block (RB) 208 may be defined by $N_{symb}$ OFDM symbols 202 consecutive in the time domain and $N_{RB}$ subcarriers 210 consecutive in the frequency domain. Accordingly, one RB 208 may include $N_{symb}*N_{RB}$ resource elements (REs) 212. An RB pair may correspond to a unit of two concatenated RBs 208 on the time axis and include $2N_{symb}*N_{RB}$ REs 212.

A basic unit of a resource in the time-frequency domain may be an RE 212 and may be represented by an OFDM symbol index and a subcarrier index.

For example, in the time-frequency domain, the RE 212 may be represented with an index "l", which indicates the position of an OFDM symbol in the time domain, and an index "k", which indicates the position of a subcarrier in the frequency domain. In other words, when the RE 212 is represented with (k,l), it may indicate the position of the RE 212 in the time-frequency domain.

When resources allocated to a serving cell overlap with resources allocated to an interference cell, a base station device may transmit, to a UE, resource allocation information of the interference cell, which indicates the position of the interference cell in the time-frequency domain as shown in FIG. 2. For example, when the RE 212 is allocated to both the serving cell and the interference cell, the base station device may transmit, to the UE, a signal including the coordinates, i.e., (k,l), of the RE 212 in the time-frequency domain, thereby informing the UE of a region, in which interference occurs because of a signal received from the interference cell.

The UE may accurately identify the region (k,l), in which interference occurs, based on the resource allocation information of the interference cell, and apply an interference rejection filter to the region (k,l). Accordingly, the UE may perform an efficient interference removal process.

Figure 3:
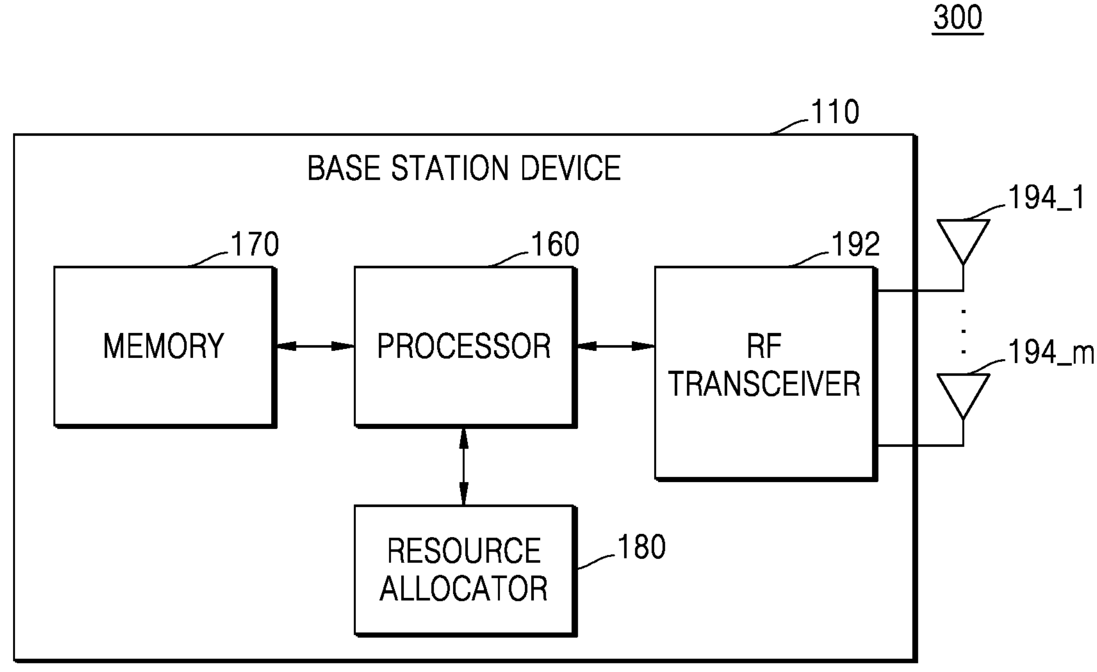
FIG. 3 is a block diagram of a base station device according to an example embodiment.

FIG. 3 is a block diagram 300 of a base station device according to an example embodiment.

Referring to FIG. 3, a base station device 110 may include a processor 160, a memory 170, a resource allocator 180, a radio frequency (RF) transceiver 192, and a plurality of antennas 194_1 to **194_*m***.

The RF transceiver 192 may transmit RF signals to a UE through the antennas 194_1 to **194_*m* and a serving cell. The RF transceiver 192 may generate intermediate frequency (IF) or baseband signals by down-converting RF signals received from a UE. The processor 160 may generate data signals by filtering, decoding, and/or digitizing IF or baseband signals. The processor 160** may additionally process data signals.

The RF transceiver 192 may receive data signals from the processor 160. The RF transceiver 192 may encode, multiplex, and/or convert into analog the data signals. The RF transceiver 192 may perform frequency up-conversion on IF or baseband signals output from the processor 160 and transmit RF signals to the antennas 194_1 to **194_*m***.

The memory 170 may include an operating system. The memory 170 may include a process register and/or an application, which includes device drivers, executable libraries, and/or program code. The operating system and the application are software components and may be implemented when a processor executes code and/or commands. For example, the memory 170 may store program code executed to obtain resource allocation information of an external base station device, identify occurrence or non-occurrence of an interference cell, and generate a signal including resource allocation information of the interference cell.

The processor 160 may control the base station device 110 for wireless network-based communication and transmit, to a UE, a signal (e.g., an RRC signal or a DCI signal) including resource allocation information of an interference cell so as to indicate the occurrence region of the interference cell in the time-frequency domain.

The processor 160 may execute a program and/or a process stored in the memory 170 to perform general control operations of the base station device 110. In some embodiments, the process may be stored in the memory 170 as program code executed to obtain resource allocation information of an external base station device, identify occurrence or non-occurrence of an interference cell, and generate a signal including resource allocation information of the interference cell. The processor 160 may access the memory 170 and execute the program code, thereby transmitting, to a UE, resource allocation information of the interference cell, which indicates the occurrence region of the interference cell. The operation of transmitting the resource allocation information of the interference cell is described in detail with reference to FIGS. 6 to 8 below.

According to an example embodiment, the processor 160 may be implemented by a central processing unit (CPU) or other types of processors. According to an example embodiment, the memory 170 may be implemented as a volatile memory (e.g., static random access memory (SRAM), dynamic RAM (DRAM), synchronous RAM (SDRAM), etc.) or a nonvolatile memory (flash memory, phase-change RAM (PRAM), Magneto-resistive RAM (MRAM), resistive RAM (ReRAM), ferro-electric RAM (FRAM), etc.).

When resources allocated to a reference signal of a serving cell of the base station device 110 overlap with resources allocated to an external base station device, the processor 160 may transmit, to a UE, a signal including information about the overlapping resources. This is described in detail with reference to FIG. 9 below.

A base station device according to the disclosure may inform a UE of the accurate occurrence region or position of an interference cell by transmitting, to the UE, a signal generated based on resource allocation information of an external base station device, which is described below with reference to FIGS. 4 and 5. Accordingly, the UE may selectively remove interference in a more focused and sophisticated manner, based on resource allocation information of the interference cell. As a result, the base station device may enable the wireless communication performance of the UE to increase.

Accordingly, there may be provided a communication device that may reliably transmit and receive data in a wireless communication system, in which there are various kinds of interference from a cell of an external base station device. Hereinafter, operations of identifying whether an interference cell occurs, based on resource allocation information of an external base station device, and transmitting, to a UE, a signal including resource allocation information of the interference cell are described in detail.

Figure 4:
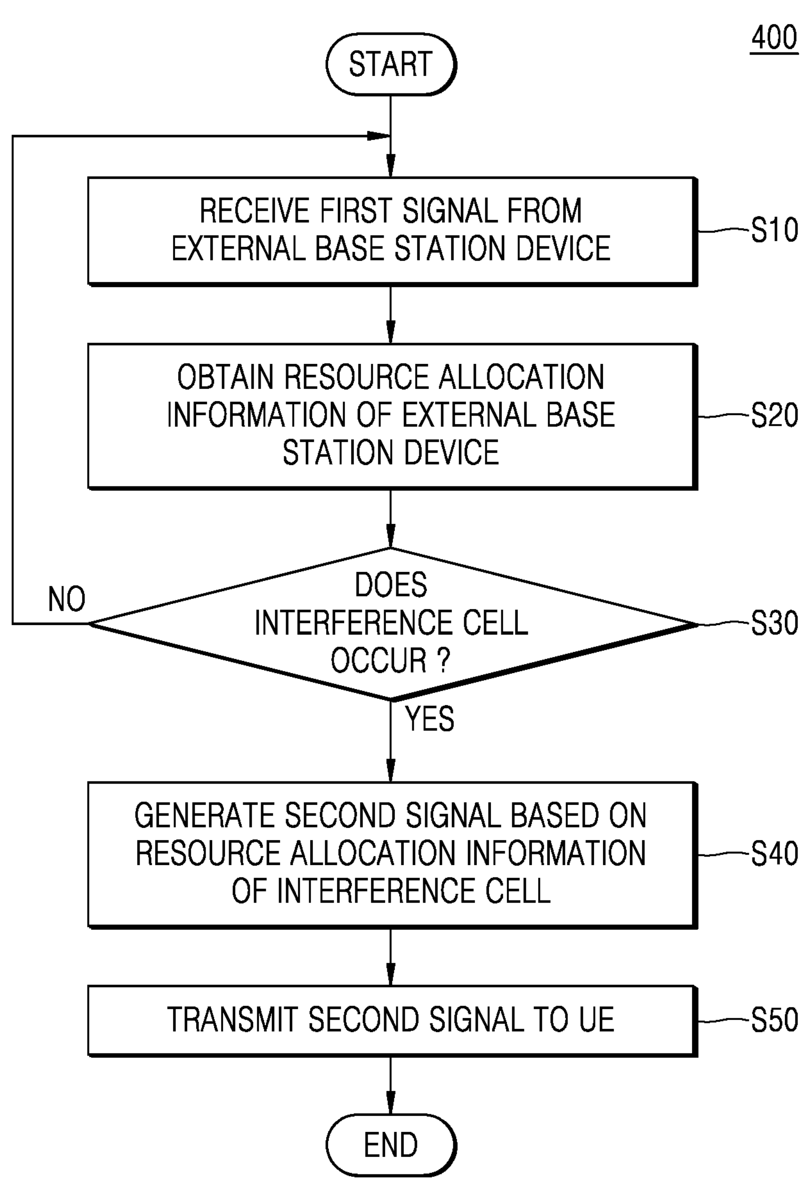
FIG. 4 is a flowchart of an operating method of a base station device, according to an example embodiment.

FIG. 4 is a flowchart 400 of an operating method of a base station device, according to an example embodiment.

In detail, FIG. 4 describes a method of transmitting a signal generated based on resource allocation information of an interference cell to a UE according to an example embodiment. According to an example embodiment, the method may be performed by a processor, e.g., the processor 160 of the base station device 110 in FIG. 3.

Referring to FIG. 4, the method of transmitting, to a UE, a signal generated based on resource allocation information of an interference cell may include operations S10, S20, S30, S40, and S50.

The processor may receive a first signal from an external base station device in operation S10. According to an example embodiment, the base stations in a network may share resource allocation information of with each other through a dedicated network. According to an example embodiment, the base station and the external base station may share resource allocation information via a backhaul link. Here, resource allocation information of the external base station device may include, but not limited to, resource allocation information regarding a cell included in the external base station device or regarding a physical channel and/or a signal of the cell.

The processor may obtain resource allocation information of the external base station device in operation S20. Here, a resource is used for wireless communication between communication devices and may refer to a wireless communication resource used for data exchange in a time-frequency domain or grid.

The processor may locate a resource (e.g., a resource element (RE)), which is used by a physical channel of the external base station device, and/or a resource (e.g., a RE), over which a signal is transmitted, based on the resource allocation information. For example, a basic unit of a resource in the time-frequency domain is an RE and may be represented with an OFDM symbol index, “l”, and a subcarrier index, “k”.

For example, the processor may obtain coordinate information, i.e., (k,l), in the time-frequency grid as position information of an RE, which is used by the physical channel of the external base station device, or of an RE, over which a signal is transmitted.

The processor may identify whether an interference cell occurs in operation S30.

Here, the interference cell may refer to a particular cell of the external base station device. According to an example embodiment, the particular cell may be a cell that is physically adjacent to a serving cell of a base station device including the processor and uses resources overlapping with resources allocated to the serving cell. According to an example embodiment, the particular cell may be a cell that may physically overlap the serving cell of the base station device. The interference cell may transmit an interference signal to a UE.

The processor may identify whether an interference cell occurs by comparing the resource allocation information of the external base station device with resource allocation information of a serving cell. According to an example embodiment, the processor may identify whether an interference cell is present by comparing the resource allocation information of the external base station device with resource allocation information of a serving cell. For example, the processor may identify whether an interference cell occurs, according to whether the coordinates of an RE allocated to the external base station device coincide with the coordinates of an RE allocated to the serving cell. For example, the interference cell is a cell that includes at least some elements that interfere with the serving cell of the base station.

For example, when the coordinates of an RE allocated to the external base station device coincide with the coordinates of an RE allocated to the serving cell, the processor may identify that an interference cell occurs. Otherwise, when the coordinates of an RE allocated to the external base station device do not coincide with the coordinates of an RE allocated to the serving cell, the processor may identify that an interference cell does not occur. That is, when the coordinates of an RE allocated to the external base station device do not coincide with the coordinates of an RE allocated to the serving cell, the processor may identify that an interference cell is not present (e.g., none the cell elements of the external base station interferes with the serving cell of the base station.

When it is identified that an interference cell occurs, the processor may perform operation S40.

Otherwise, when it is identified that an interference cell does not occur, the processor may perform operation S10.

The processor may generate a second signal, based on resource allocation information of the interference cell, in operation S40. The resource allocation information of the interference cell may include resource allocation information regarding each interference signal. At this time, the interference signal may refer to a signal that is transmitted from the interference cell to a UE using a resource overlapping with a resource used by a serving cell. The interference signal may include a signal based on a PDSCH of the interference cell, an SSB signal, or a CSI-RS.

When an interference cell occurs, the processor may generate the second signal based on the resource allocation information of the interference cell and/or signal.

For example, the processor may generate the second signal, which includes the coordinate information of an RE allocated to the interference cell or the coordinate information of an RE allocated to the interference signal in the time-frequency domain. The generation of the second signal may be described in detail with reference to FIGS. 6 to 8 below.

The processor may transmit the second signal to a UE in operation S50.

The processor may accurately inform the UE of the occurrence region of the interference cell or the interference signal in the time-frequency domain by transmitting, to the UE, the second signal including resource allocation information regarding the interference cell or the interference signal. According to an example embodiment, the UE that has received the second signal may obtain the resource allocation information regarding the interference cell or the interference signal and perform an efficient interference removal process based on the resource allocation information.

Accordingly, according to an example embodiment, a base station device may alleviate the influence of an interference cell of an external base station device on a UE and increase the performance of wireless communication with the UE.

Figure 5:
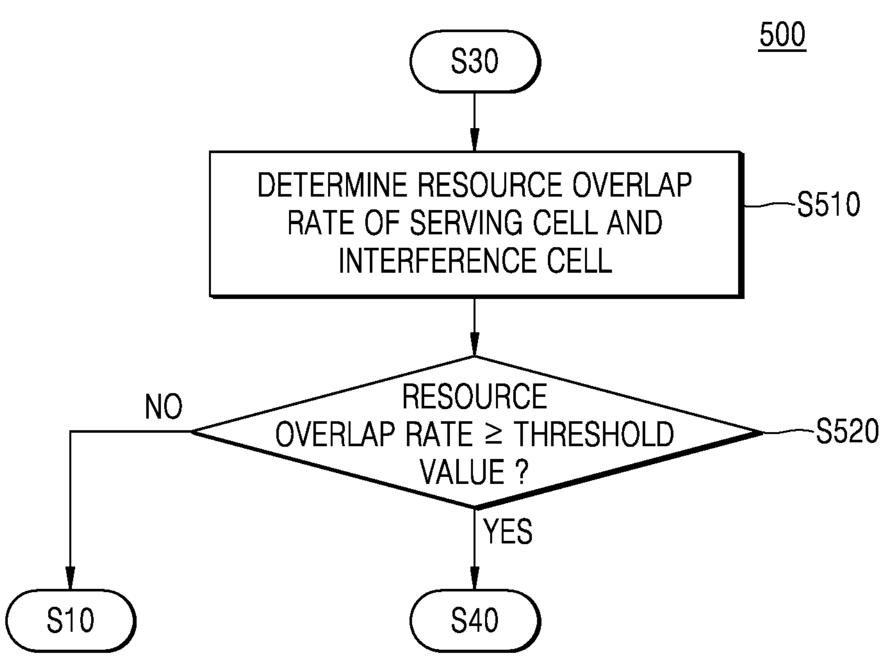
FIG. 5 is a flowchart of an operation of transmitting resource allocation information of an interference cell according to the rate of overlap between resources, according to an example embodiment.

FIG. 5 is a flowchart 500 of an operation of transmitting resource allocation information of an interference cell according to the rate of overlap between resources, according to an example embodiment.

In detail, FIG. 5 describes an operation of transmitting, to a UE, a signal generated by a processor, e.g., the processor 160 of the base station device 110 in FIG. 3, based on the resource overlap rate of a serving cell and an interference cell.

Referring to FIG. 5, the operation of transmitting, to a UE, a signal generated based on the resource overlap rate of a serving cell and an interference cell may include operations S510 and S520.

The processor may determine the resource overlap rate of a serving cell and an interference cell in operation S510. At this time, the resource overlap rate is a parameter indicating the rate of overlap between resources allocated to a serving cell and resources allocated to an interference cell in the time-frequency domain among wireless communication resources.

For example, the processor may determine the resource overlap rate, based on the degree of coincidence between the coordinates of an RE allocated to the interference cell of the external base station device and the coordinates of an RE allocated to the serving cell in the time-frequency domain. According to an example embodiment, the degree of coincidence may be an amount of overlap between the coordinates of an RE allocated to the interference cell of the external base station device and the coordinates of an RE allocated to the serving cell in the time-frequency domain. According to an example embodiment, the amount of overlap may be a number of the coordinates of an RE allocated to the interference cell of the external base station device that is same as the coordinates of an RE allocated to the serving cell in the time-frequency domain.

The processor may identify whether the resource overlap rate is greater than or equal to a threshold value in operation S520.

When the resource overlap rate is greater than or equal to the threshold value, the processor may perform operation S40 in FIG. 4. When the resource overlap rate is less than the threshold value, the processor may perform operation S10 in FIG. 4.

In the case where resource allocation information is transmitted to a UE each time when there is resource overlap between a serving cell and an interference cell in a wireless communication system, excessive overhead may occur in the wireless communication system during the transmission of the resource allocation information.

According to an example embodiment, a processor may prevent the occurrence of excessive overhead or the unnecessary consumption of power by identifying a resource overlap rate and transmitting a signal, which includes resource allocation information of an interference cell, to a UE only when the resource overlap rate is greater than or equal to a threshold value.

Figure 6:
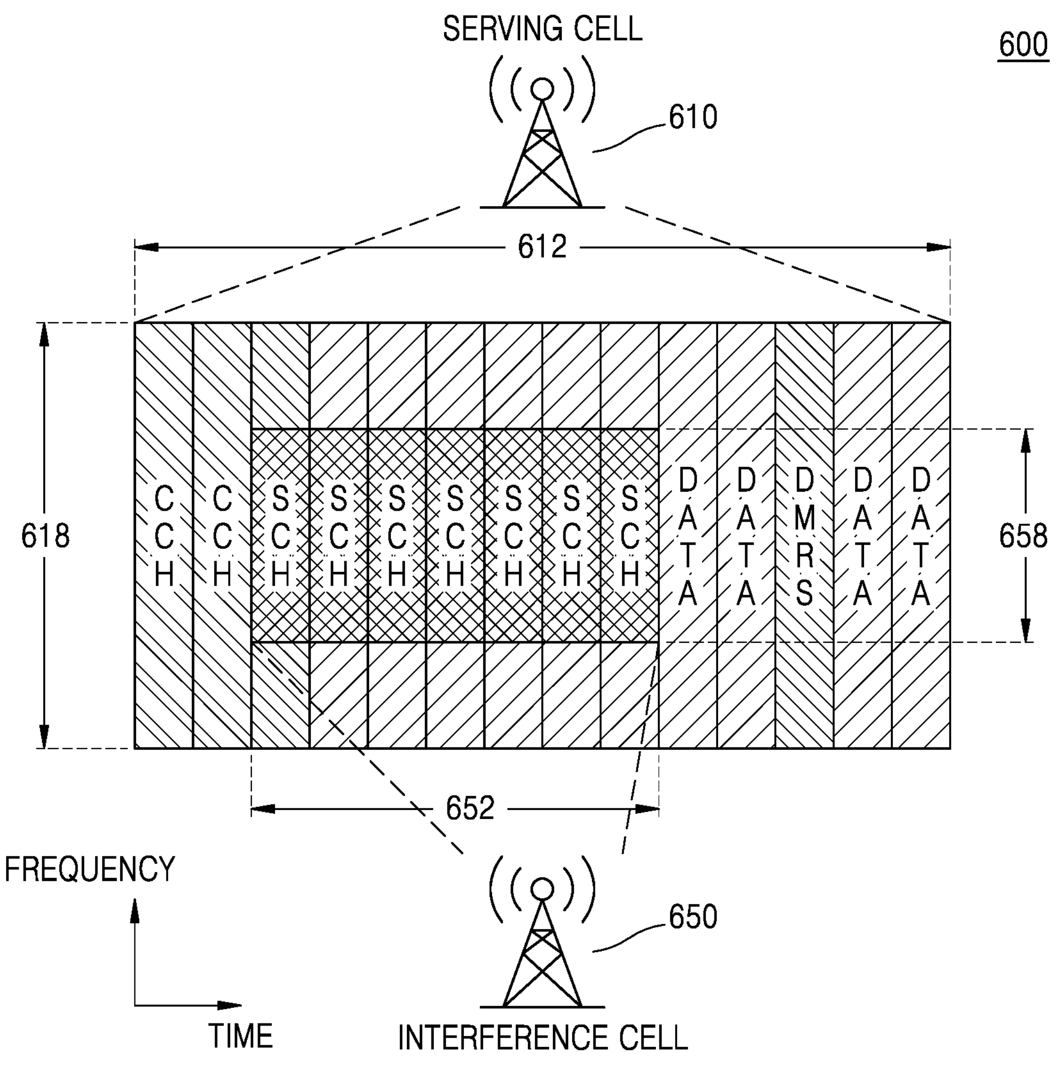
FIG. 6 is a diagram illustrating the resource overlap between a signal of a serving cell and a physical downlink shared channel (PDSCH) of an interference cell, according to an example embodiment.

FIG. 6 is a diagram 600 illustrating the resource overlap between a signal of a serving cell and a PDSCH of an interference cell, according to an example embodiment.

In detail, FIG. 6 is provided to describe an operation of generating, a signal based on resource allocation information regarding a PDSCH in an interference signal of the interference cell. According to an example embodiment, the operation of generating the signal may be performed by the processor 160 of the base station device 110 in FIG. 3.

Referring to FIG. 6, the horizontal axis may be the time domain and the vertical axis may be the frequency domain. It is assumed that a resource allocated to a serving cell 610 includes a first time-domain resource 612 and a first frequency-domain resource 618 and a resource allocated to a PDSCH of an interference cell 650 includes a second time-domain resource 652 and a second frequency-domain resource 658.

As shown in FIG. 6, the second time-domain resource 652 and the second frequency-domain resource 658 are overlapping resources allocated to both the serving cell 610 and the interference cell 650, and interference between a signal of the serving cell 610 and a signal based on the PDSCH of the interference cell 650 may occur in a domain corresponding to the overlapping resources. For example, interference between a signal including a demodulation-reference signal (DM-RS) and data of the serving cell 610 and a signal based on the PDSCH of the interference cell 650 may occur in an overlapping resource domain corresponding to the second time-domain resource 652 and the second frequency-domain resource 658.

The base station device 110 may generate a signal including time-frequency domain resource allocation information regarding the PDSCH of the interference cell 650 and transmit the signal to a UE, thereby informing the UE of an occurrence region of interference.

For example, referring to TS 38.331 and TS 38.212, information about a PDSCH defined in an RRC message and DCI is shown in Table 1 and Table 2 below.

TABLE 1

```
PDSCH-Config information element
-- ASN1START
-- TAG-PDSCH-CONFIG-START
PDSCH-Config ::=                                SEQUENCE {
  dataScramblingIdentityPDSCH                         INTEGER (0..1023)
OPTIONAL,   -- Need S
  dmrs-DownlinkForPDSCH-MappingTypeA                     SetupRelease { DMRS-DownlinkConfig }
OPTIONAL,   -- Need M
  dmrs-DownlinkForPDSCH-MappingTypeB                     SetupRelease { DMRS-DownlinkConfig }
OPTIONAL,   -- Need M
  tci-StatesToAddModList                            SEQUENCE (SIZE( 1..maxNrofTCI-States)) OF TCI-State
OPTIONAL,   -- Need N
  tci-StatesToReleaseList                         SEQUENCE (SIZE(1..maxNrofTCI-States)) OF TCI-StateId
OPTIONAL,   -- Need N
  vrb-ToPRB-Interleaver                             ENUMERATED {n2, n4}                OPTIONAL,
-- Need S
  resourceAllocation                            ENUMERATED { resourceAllocationType0, resourceAllocationType1,
dynamicSwitch},
  pdsch-TimeDomainAllocationList                         SetupRelease { PDSCH-TimeDomainResourceAllocationList }
OPTIONAL,   -- Need M
  pdsch-AggregationFactor                           ENUMERATED { n2, n4, n8 }
OPTIONAL,   -- Need S
```

TABLE 1-continued

```
  rateMatchPatternToAddModList                                  SEQUENCE (SIZE (1..maxNrofRateMatchPatterns)) OF
RateMatchPattern   OPTIONAL,   -- Need N
  rateMatchPatternToReleaseList                                SEQUENCE (SIZE (1..maxNrofRateMatchPatterns)) OF
RateMatchPatternId OPTIONAL,   -- Need N
  rateMatchPatternGroup1                                  RateMatchPatternGroup                 OPTIONAL,
-- Need R
  rateMatchPatternGroup2                                  RateMatchPatternGroup                 OPTIONAL,
-- Need R
  rbg-Size                             ENUMERATED {config1, config2},
  mcs-Table                              ENUMERATED {qam256, qam64LowSE}
OPTIONAL,   -- Need S
  maxNrofCodeWordsScheduledByDCI                                 ENUMERATED {n1, n2}
OPTIONAL,   -- Need R
  prb-BundlingType                             CHOICE {
    staticBundling                             SEQUENCE {
      bundleSize                                   ENUMERATED { n4, wideband }           OPTIONAL
-- Need S
    },
    dynamicBundling                            SEQUENCE {
      bundleSizeSet1                             ENUMERATED { n4, wideband, n2-wideband, n4-wideband }
OPTIONAL,   -- Need S
      bundleSizeSet2                             ENUMERATED { n4, wideband }              OPTIONAL
-- Need S
    }
  },
PDSCH-TimeDomainResourceAllocationList information element
-- ASN1START
-- TAG-PDSCH-TIMEDOMAINRESOURCEALLOCATIONLIST-START
PDSCH-TimeDomainResourceAllocationList ::=   SEQUENCE (SIZE(1..maxNrofDL-Allocations)) OF
PDSCH-TimeDomainResourceAllocation
PDSCH-TimeDomainResourceAllocation ::=   SEQUENCE {
  k0                                   INTEGER(0..32)                              OPTIONAL,   -- Need S
  mappingType                               ENUMERATED {typeA, typeB},
  startSymbolAndLength                             INTEGER (0..127)
}
PDSCH-TimeDomainResourceAllocationList-r16 ::=   SEQUENCE (SIZE(1..maxNrofDL-Allocations))
OF PDSCH-TimeDomainResourceAllocation-r16
PDSCH-TimeDomainResourceAllocation-r16 ::=   SEQUENCE {
  k0-r16                                 INTEGER(0..32)                           OPTIONAL,   -- Need S
  mappingType-r16                                 ENUMERATED {typeA, typeB},
  startSymbolAndLength-r16                               INTEGER (0..127),
  repetitionNumber-r16                              ENUMERATED {n2, n3, n4, n5, n6, n7, n8, n16}
OPTIONAL,   -- Cond Formats1-0and1-1
  ...
}
-- TAG-PDSCH-TIMEDOMAINRESOURCEALLOCATIONLIST-STOP
-- ASN1STOP
```

TABLE 2

The following information is transmitted by means of the DCI format 1_1 with CRC scrambled by C-RNTI or CS-RNTI or MCS-C-RNTI:

Frequency domain resource assignment - number of bits determined by the following, where $N_{RB}^{DL,BWP}$ is the size of the active DL bandwidth part:

$N_{RBG}$ bits if only resource allocation type 0 is configured, where NRR is defined in Clause 5.1.2.2.1 of [6, TS38.214], $\lceil \log_2(N_{RB}^{DL,BWP}(N_{RB}^{DL,BWP}+1)/2) \rceil$ bits if only resource allocation type 1 is configured, or $\max(\lceil \log_2(N_{RB}^{DL,BWP}(N_{RB}^{DL,BWP}+1)/2) \rceil, N_{RBG})+1$ bits if resourceAllocation is configured as 'dynamicSwitch'.

If resourceAllocation is configured as 'dynamicSwitch', the MSB bit is used to indicate resource allocation type 0 or resource allocation type 1, where the bit value of 0 indicates resource allocation type 0 and the bit value of 1 indicates resource allocation type 1.

TABLE 2-continued

For resource allocation type 0, the $N_{RBG}$ LSBs provide the resource allocation as defined in Clause 5.1.2.2.1 of [6, TS 38.214].

For resource allocation type 1, the $\lceil \log_2(N_{RB}^{DL,BWP}(N_{RB}^{DL,BWP}+1)/2) \rceil$ LSBs provide the resource allocation as defined in Clause 5.1.2.2.2 of [6, TS 38.214]

If "Bandwidth part indicator" field indicates a bandwidth part other than the active bandwidth part and if resourceAllocation is configured as 'dynamicSwitch' for the indicated bandwidth part, the UE assumes resource allocation type 0 for the indicated bandwidth part if the bitwidth of the "Frequency domain resource assignment" field of the active bandwidth part is smaller than the bitwidth of the "Frequency domain resource assignment" field of the indicated bandwidth part.

Time domain resource assignment - 0, 1, 2, 3, or 4 bits as defined in Clause 5.1.2.1 of [6, TS 38.214]. The bitwidth for this field is determined as [log, (I)] bits, where I is the number of entries in the higher layer parameter pdsch-TimeDomainAllocationList if the higher layer parameter is configured; otherwise I is the number of entries in the default table.

Here, the PDSCH-Config information element in Table 1 may represent a frequency domain resource allocation type through resource allocation configuration information and indicate a position of a subcarrier allocated to the PDSCH, based on a value of "frequency domain resource assignment" of the DCI in Table 2.

The PDSCH-TimeDomainResourceAllocationList information element in Table 1 may represent the number of time domain resource allocations, which may be set by the base station device, and indicate a time domain resource allocation type, which is set by the base station device, through the "time domain resource assignment" field of the DCI in Table 2.

For example, the base station device 110 may generate the second signal by configuring the time-frequency domain resource allocation information regarding the PDSCH of the interference cell 650, i.e., InterferencePDSCH-Config information element, as an RRC message, referring to TS 38.331 and TS 38.212, as shown in Table 3 below. At this time, time domain resource allocation information regarding the PDSCH of the interference cell 650 may include a slot offset and a start and length indicator. Frequency domain resource allocation information regarding the PDSCH of the interference cell 650 may include information about a resource allocation type, a resource block group (RBG) size, and a frequency domain resource assignment bitmap.

TABLE 3

```
InterferencePDSCH-Config information element
InterferencePDSCH-Config ::=            SEQUENCE {
  resourceAllocation                   ENUMERATED { resourceAllocationType0, resourceAllocationType1,
dynamicSwitch},
  pdsch-TimeDomainAllocationList           SetupRelease { PDSCH-TimeDomainResourceAllocationList }
OPTIONAL,   -- Need M
  rbg-Size                            ENUMERATED {config1, config2},
}
```

According to an example embodiment, the base station device 110 may generate the second signal, which configures the time-frequency domain resource allocation information regarding the PDSCH of the interference cell 650 as DCI, by adding information about "interference frequency domain resource assignment" and "interference time domain resource assignment" to "DCI Format 1_0", "DCI Format 1_1", or "DCI Format 1_2". The "interference frequency domain resource assignment" may represent information corresponding to the "frequency domain resource assignment" in Table 2, and the "interference time domain resource assignment" may represent information corresponding to the "time domain resource assignment" in Table 2.

According to an example embodiment, a base station device may additionally configure time-frequency domain resource allocation information regarding the PDSCH of an interference cell as an RRC message or DCI and thus inform a UE of a region, in which interference occurs because of the PDSCH of the interference cell, such that the UE may be induced to accurately remove the interference.

Although FIG. 6 is illustrated assuming the resource allocation type that allocates some of resources of a serving cell to the PDSCH of an interference cell and thus causes interference to occur in a partial resource domain of the serving cell, embodiments are not limited thereto.

Figure 7:
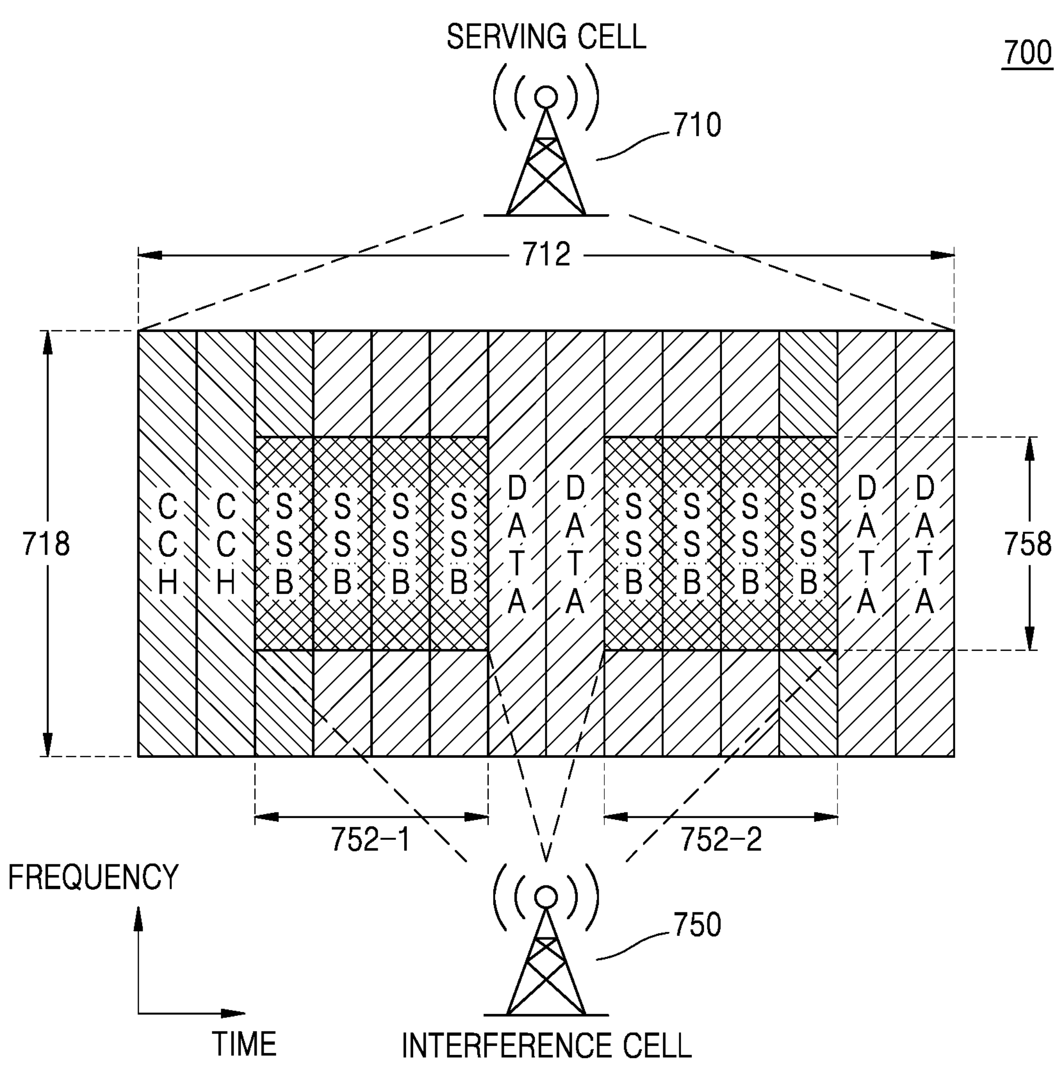
FIG. 7 is a diagram illustrating the resource overlap between a signal of a serving cell and a synchronization signal block (SSB) of an interference cell, according to an example embodiment.

FIG. 7 is a diagram 700 illustrating the resource overlap between a signal of a serving cell and an SSB of an interference cell, according to an example embodiment.

In detail, FIG. 7 is provided to describe an operation of generating, performed by the processor 160 of the base station device 110 in FIG. 3, a signal based on resource allocation information regarding the SSB in an interference signal of the interference cell.

Referring to FIG. 7, the horizontal axis may be the time domain and the vertical axis may be the frequency domain. It is assumed that a resource allocated to a serving cell 710 includes a first time-domain resource 712 and a first frequency-domain resource 718 and a resource allocated to the SSB of an interference cell 750 includes second time-domain resources 752-1 and 752-2 and a second frequency-domain resource 758.

As shown in FIG. 7, the second time-domain resources 752-1 and 752-2 and the second frequency-domain resource 758 are overlapping resources allocated to both the serving cell 710 and the interference cell 750, and interference between a signal of the serving cell 710 and a signal based on the SSB of the interference cell 750 may occur in a domain corresponding to the overlapping resources. For example, interference between a signal including a DM-RS and data of the serving cell 710 and a signal based on the SSB of the interference cell 750 may occur in an overlapping resource domain corresponding to the second time-domain resources 752-1 and 752-2 and the second frequency-domain resource 758.

The base station device 110 may generate a signal including time-frequency domain resource allocation information regarding the SSB of the interference cell 750 and transmit the signal to a UE, thereby informing the UE of an occurrence region of interference.

For example, referring to TS 38.331, information about an SSB defined in an RRC message is shown in Table 4 below.

TABLE 4

```
ServingCellConfigCommon information element
-- ASN1START
-- TAG-SERVINGCELLCONFIGCOMMON-START
ServingCellConfigCommon ::=          SEQUENCE {
  physCellId                 PhysCellId                    OPTIONAL,   -- Cond
HOAndServCellAdd,
  downlinkConfigCommon            DownlinkConfigCommon              OPTIONAL,
-- Cond HOAndServCellAdd
  uplinkConfigCommon           UplinkConfigCommon              OPTIONAL,   --
Need M
  supplementaryUplinkConfig         UplinkConfigCommon              OPTIONAL,   --
Need S
  n-TimingAdvanceOffset           ENUMERATED { n0, n25600, n39936 }
OPTIONAL,   -- Need S
  ssb-PositionsInBurst          CHOICE {
    shortBitmap               BIT STRING (SIZE (4)),
    mediumBitmap               BIT STRING (SIZE (8)),
    longBitmap               BIT STRING (SIZE (64))
  }                                         OPTIONAL, -- Cond AbsFreqSSB
  ssb-periodicityServingCell         ENUMERATED { ms5, ms10, ms20, ms40, ms80, ms160, spare2,
spare1 }   OPTIONAL, -- Need S
  dmrs-TypeA-Position           ENUMERATED {pos2, pos3},
  lte-CRS-ToMatchAround            SetupRelease { RateMatchPatternLTE-CRS }
OPTIONAL, -- Need M
  rateMatchPatternToAddModList          SEQUENCE (SIZE (1..maxNrofRateMatchPatterns)) OF
RateMatchPattern   OPTIONAL, -- Need N
  rateMatchPatternToReleaseList        SEQUENCE (SIZE (1..maxNrofRateMatchPatterns)) OF
RateMatchPatternId OPTIONAL, -- Need N
  ssbSubcarrierSpacing           SubcarrierSpacing              OPTIONAL, -- Cond
HOAndServCellWithSSB
  tdd-UL-DL-ConfigurationCommon           TDD-UL-DL-ConfigCommon
OPTIONAL, -- Cond TDD
  ss-PBCH-BlockPower            INTEGER (-60..50),
  ...,
  [[
  channelAccessMode-r16            CHOICE {
    dynamic                 NULL,
    semiStatic               SemiStaticChannelAccessConfig-r16
  }                                         OPTIONAL, -- Cond SharedSpectrum
  discoveryBurstWindowLength-r16          ENUMERATED {ms0dot5, ms1, ms2, ms3, ms4, ms5}
OPTIONAL, -- Need R
  ssb-PositionQCL-r16            SSB-PositionQCL-Relation-r16          OPTIONAL, --
Cond SharedSpectrum
  highSpeedConfig-r16            HighSpeedConfig-r16             OPTIONAL   -- Need
R
  ]]
}
-- TAG-SERVINGCELLCONFIGCOMMON-STOP
-- ASN1STOP
FrequencyInfoDL information element
-- ASN1START
-- TAG-FREQUENCYINFODL-START
FrequencyInfoDL ::=          SEQUENCE {
  absoluteFrequencySSB           ARFCN-ValueNR              OPTIONAL,   -- Cond
SpCellAdd
  frequencyBandList            MultiFrequencyBandListNR,
  absoluteFrequencyPointA          ARFCN-ValueNR,
  scs-SpecificCarrierList          SEQUENCE (SIZE (1..maxSCSs)) OF SCS-SpecificCarrier,
  ...
}
-- TAG-FREQUENCYINFODL-STOP
-- ASN1STOP
```

Here, "ssbSubcarrierSpacing" of the ServingCellConfigCommon information element of the RRC message in Table 4 may represent subcarrier spacing information of the SSB in the frequency domain and represent a frequency used by the SSB through "absoluteFrequencySSB" of the FrequencyInfoDL information element. In addition, the ServingCellConfigCommon information element may represent, with a bitmap, allocation or non-allocation of an SSB in a half frame in the time domain through "ssb-PositionsInBurst" and represent a transmission period of the SSB through "ssb-periodicityServingCell".

For example, the base station device 110 may generate the second signal by configuring the time-frequency domain resource allocation information regarding the SSB of the interference cell 750, i.e., Interference-SSB-Config information element, as an RRC message, referring to TS 38.331, as shown in Table 5 below.

At this time, time domain resource allocation information regarding the SSB of the interference cell 750 may include information about the periodicity of the SSB and a bitmap about allocation or non-allocation of the SSB in a half frame. Frequency domain resource allocation information regarding the SSB of the interference cell 750 may include information about a frequency used by the SSB based on an absolute frequency field and the subcarrier spacing of the SSB.

TABLE 5

```
Interference-SSB-config information element
-- ASN1START
-- TAG-SERVINGCELLCONFIGCOMMON-START
Interference-SSB-config ::=        SEQUENCE {
  downlinkConfigCommon                    DownlinkConfigCommon
OPTIONAL,    -- Cond HOAndServCellAdd
  ssb-PositionsInBurst             CHOICE {
    shortBitmap                    BIT STRING (SIZE (4)),
    mediumBitmap                        BIT STRING (SIZE (8)),
    longBitmap                     BIT STRING (SIZE (64))
  }                                                          OPTIONAL, -- Cond AbsFreqSSB
  ssb-periodicityServingCell            ENUMERATED { ms5, ms10, ms20, ms40, ms80, ms160, spare2,
spare1 }   OPTIONAL, -- Need S
    ssbSubcarrierSpacing            SubcarrierSpacing              OPTIONAL, -- Cond
HOAndServCellWithSSB
}
-- TAG-SERVINGCELLCONFIGCOM
```

According to an example embodiment, a base station device may additionally configure time-frequency domain resource allocation information regarding the SSB of an interference cell 750 as an RRC message and thus inform a UE of a region, in which interference occurs because of the SSB of the interference cell, such that the influence of the interference cell may be alleviated in a wireless communication system.

Figure 8:
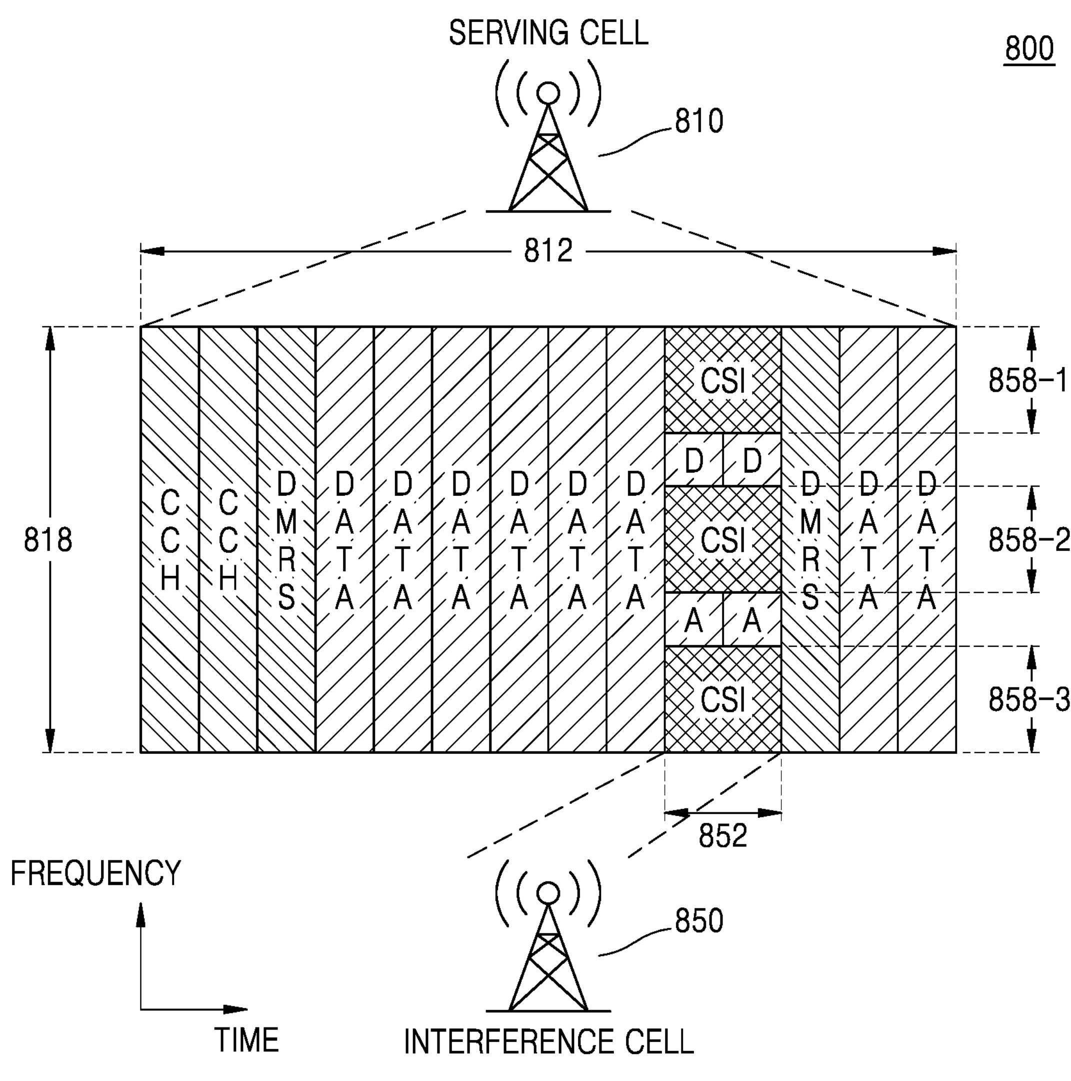
FIG. 8 is a diagram illustrating the resource overlap between a signal of a serving cell and a channel status information-reference signal (CSI-RS) of an interference cell, according to an example embodiment.

FIG. 8 is a diagram 800 illustrating the resource overlap between a signal of a serving cell and a CSI-RS of an interference cell, according to an example embodiment.

In detail, FIG. 8 is provided to describe an operation of generating, performed by the processor 160 of the base station device 110 in FIG. 3, a signal based on resource allocation information regarding the CSI-RS in an interference signal of the interference cell.

Referring to FIG. 8, the horizontal axis may be the time domain and the vertical axis may be the frequency domain. It is assumed that a resource allocated to a serving cell 810 includes a first time-domain resource 812 and a first frequency-domain resource 818 and a resource allocated to the CSI-RS of an interference cell 850 includes a second time-domain resource 852 and second frequency-domain resources 858-1, 858-2 and 858-3.

As shown in FIG. 8, the second time-domain resource 852 and the second frequency-domain resources 858-1, 858-2 and 858-3 are overlapping resources allocated to both the serving cell 810 and the interference cell 850, and interference between a signal of the serving cell 810 and a signal based on the CSI-RS of the interference cell 850 may occur in a domain corresponding to the overlapping resources. For example, interference between a signal including data of the serving cell 810 and a signal based on the CSI-RS of the interference cell 850 may occur in an overlapping resource domain corresponding to the second time-domain resource 852 and the second frequency-domain resources 858-1, 858-2 and 858-3.

The base station device 110 may generate a signal including time-frequency domain resource allocation information regarding the CSI-RS of the interference cell 850 and transmit the signal to a UE, thereby informing the UE of an occurrence region of interference.

For example, referring to TS 38.331, information about a CSI-RS defined in an RRC message is shown in Table 6 below.

TABLE 6

```
NZP-CSI-RS-Resource information element
-- ASN1START
-- TAG-NZP-CSI-RS-RESOURCE-START
NZP-CSI-RS-Resource ::=                     SEQUENCE {
  nzp-CSI-RS-ResourceId                       NZP-CSI-RS-ResourceId,
  resourceMapping                           CSI-RS-ResourceMapping,
  powerControlOffset                        INTEGER (-8..15),
  powerControlOffsetSS                        ENUMERATED {db-3, db0, db3, db6}        OPTIONAL,   -- Need
R
  scramblingID                            ScramblingId,
  periodicityAndOffset                      CSI-ResourcePeriodicityAndOffset            OPTIONAL,   -- Cond
PeriodicOrSemiPersistent
  qcl-InfoPeriodicCSI-RS                      TCI-StateId                       OPTIONAL,   -- Cond Periodic
  ...
}
-- TAG-NZP-CSI-RS-RESOURCE-STOP
-- ASN1STOP
CSI-RS-ResourceMapping information element
-- ASN1START
-- TAG-CSI-RS-RESOURCEMAPPING-START
CSI-RS-ResourceMapping ::=                    SEQUENCE {
  frequencyDomainAllocation                     CHOICE {
    row1                              BIT STRING (SIZE (4)),
    row2                              BIT STRING (SIZE (12)),
    row4                              BIT STRING (SIZE (3)),
    other                           BIT STRING (SIZE (6))
  },
```

TABLE 6-continued

```
  nrofPorts                          ENUMERATED {p1,p2,p4,p8,p12,p16,p24,p32},
  firstOFDMSymbolInTimeDomain                   INTEGER (0..13),
  firstOFDMSymbolInTimeDomain2                   INTEGER (2..12)
OPTIONAL,   -- Need R
  cdm-Type                           ENUMERATED {noCDM, fd-CDM2, cdm4-FD2-TD2, cdm8-FD2-TD4},
  density                          CHOICE {
    dot5                             ENUMERATED {evenPRBs, oddPRBs},
    one                              NULL,
    three                            NULL,
    spare                            NULL
  },
  freqBand                           CSI-FrequencyOccupation,
  ...
}
-- TAG-CSI-RS-RESOURCEMAPPING-STOP
-- ASN1STOP
```

Here, the CSI-RS-ResourceMapping information element of the RRC message in Table 6 may represent information about an RB, over which the CSI-RS is transmitted in the frequency domain, through "freqBand" and represent the subcarrier position of the CSI-RS in the RB through "frequencyDomainAllocation", "nrofPorts", and "density".

The NZP-CSI-RS-Resource information element may include information about a slot, in which the CSI-RS is transmitted in the time domain, as "periodicityAndOffset" and represent the position of the CSI-RS in the slot using "firstOFDMSymbolInTimeDomain", "firstOFDMSymbolInTimeDomain2", "nrofPorts", and "density".

For example, the base station device 110 may generate the second signal by additionally configuring the time-frequency domain resource allocation information regarding the CSI-RS of the interference cell 850, i.e., Interference-NZP-CSI-RS-ResourceSet, as an RRC message, referring to TS 38.331, as shown in Table 7 below.

At this time, time domain resource allocation information regarding the CSI-RS of the interference cell 850 may include information about the periodicity and offset of the CSI-RS and the first OFDM symbol of the CSI-RS. Frequency domain resource allocation information regarding the CSI-RS of the interference cell 850 may include information about the number of ports, density, the subcarrier position of the CSI-RS in an RB, which is specified based on a code division multiplexing (CDM) type, a start RB of the CSI-RS, and the number of RBs.

TABLE 7

```
Interference-NZP-CSI-RS-ResourceSet ::=          SEQUENCE {
  nzp-CSI-ResourceSetId                    NZP-CSI-RS-ResourceSetId,
  nzp-CSI-RS-Resources                     SEQUENCE (SIZE (1..maxNrofNZP-CSI-RS-ResourcesPerSet)) OF
NZP-CSI-RS-ResourceId,
  repetition                        ENUMERATED { on, off }            OPTIONAL,   --
Need S
  aperiodicTriggeringOffset                INTEGER(0..6)                 OPTIONAL,   --
Need S
  trs-Info                        ENUMERATED {true}              OPTIONAL,   --
Need R
  ...,
  [[
  aperiodicTriggeringOffset-r16               INTEGER(0..31)                OPTIONAL   --
Need S
  ]]
}
```

According to an example embodiment, a base station device may additionally configure time-frequency domain resource allocation information regarding the CSI-RS of an interference cell 850 as an RRC message and thus inform a UE of a region, in which interference occurs because of the CSI-RS of the interference cell, such that wireless communication performance may be increased by effective interference removal in a wireless communication system.

Figure 9:
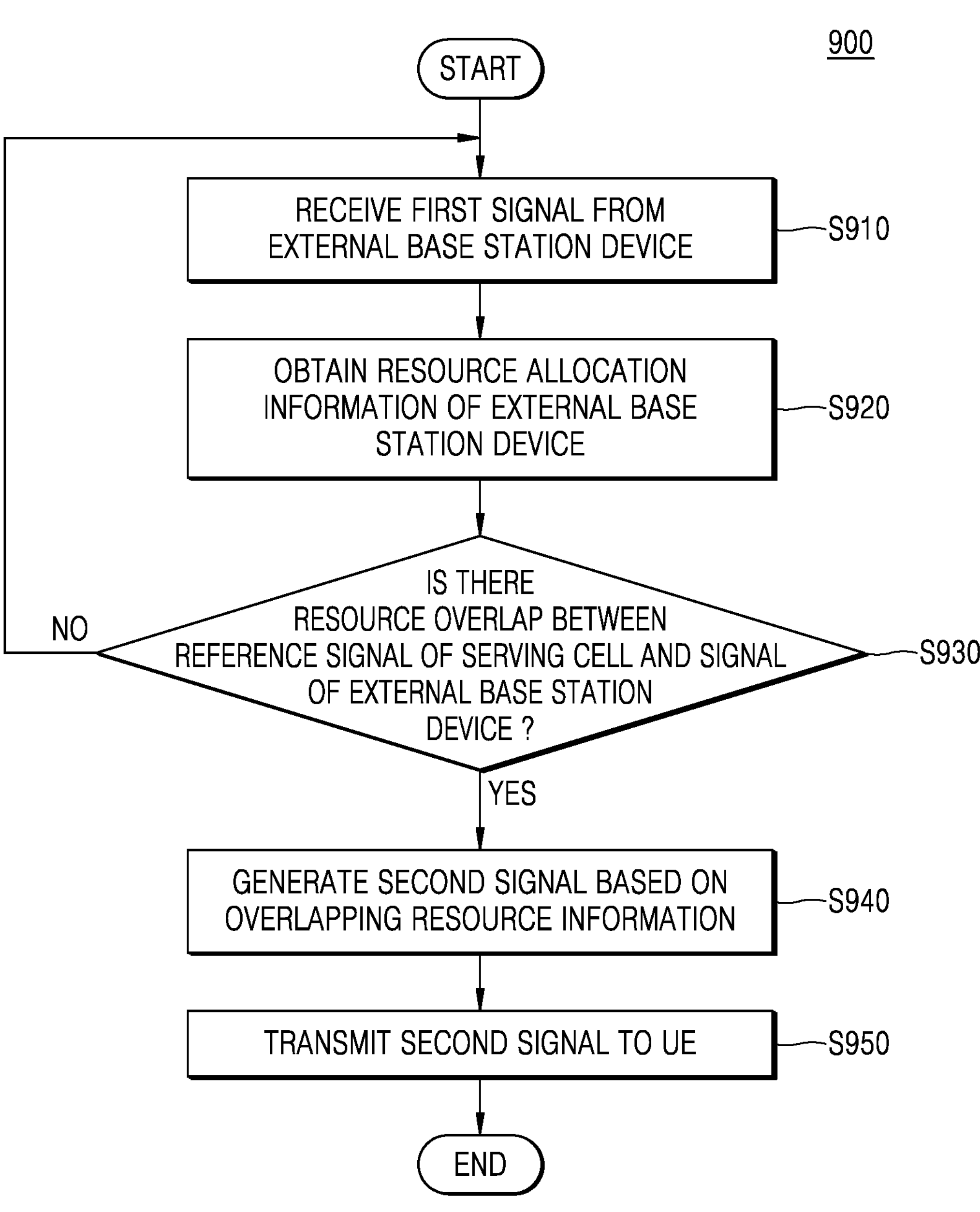
FIG. 9 is a flowchart of an operating method of a base station device, according to an example embodiment.

FIG. 9 is a flowchart of an operating method of a base station device, according to an example embodiment.

In detail, FIG. 9 describes a method of transmitting, a signal generated based on information about an overlapping resource allocated to both an interference cell and a reference signal of a serving cell to a UE. According to an example embodiment, the method of transmitting the signal may be performed by a processor, e.g., the processor 160 of the base station device 110 in FIG. 3.

Referring to FIG. 9, the method of transmitting, to a UE, a signal generated based on information about an overlapping resource allocated to both an interference cell and a reference signal of a serving cell may include operations S910, S920, S930, S940, and S950.

The processor may receive a first signal from an external base station device in operation S910. According to an example embodiment, the base stations in a network may share resource allocation information with each other through a dedicated network. According to an example embodiment, the base station and the external base station may share resource allocation information via a backhaul link. Here, resource allocation information of the external base station device may include, but not is limited to resource allocation information regarding a cell included in the external base station device or regarding a physical channel and/or a signal of the cell.

The processor may obtain resource allocation information of the external base station device in operation S920. Here, a resource is used for wireless communication between communication devices and may refer to a wireless communication resource used for data exchange in the time-frequency domain or grid.

The processor may locate a resource (e.g., an RE), which is used by the physical channel of the external base station device, and/or a resource (e.g., an RE), over which a signal is transmitted, based on the resource allocation information. For example, a basic unit of a resource in the time-frequency domain is an RE and may be represented with the OFDM symbol index, "l", and the subcarrier index, "k".

For example, the processor may obtain coordinate information, i.e., (k,l), in the time-frequency grid as position information of an RE, which is used by the physical channel of the external base station device, or of an RE, over which a signal is transmitted.

The processor may identify whether there is resource overlap between a reference signal of a serving cell and a signal of the external base station device in operation S930. Here, the reference signal of the serving cell may be a DM-RS of the serving cell and transmitted in each slot.

The processor may identify whether there is resource overlap by comparing the resource allocation information of the external base station device with resource allocation information regarding the reference signal of the serving cell. For example, the processor may identify whether there is resource overlap between the reference signal of the serving cell and the signal of the external base station device according to whether the coordinates of an RE allocated to the external base station device coincide with the coordinates of an RE allocated to the reference signal of the serving cell.

For example, when the coordinates of an RE allocated to the external base station device coincide with the coordinates of an RE allocated to the serving cell, the processor may identify that there is resource overlap between the reference signal of the serving cell and the signal of the external base station device. Otherwise, when the coordinates of an RE allocated to the external base station device do not coincide with the coordinates of an RE allocated to the serving cell, the processor may identify that there is no resource overlap between the reference signal of the serving cell and the signal of the external base station device.

When there is resource overlap between the reference signal of the serving cell and the signal of the external base station device, the processor may perform operation S940.

Otherwise, when there is no resource overlap between the reference signal of the serving cell and the signal of the external base station device, the processor may perform operation S910.

The processor may generate a second signal, based on overlapping resource information, in operation S940.

The overlapping resource information may include a signal, which is transmitted from an interference cell to a UE by using the resource overlapping with a resource allocated to the reference signal of the serving cell, wherein the signal may be based on a PDSCH of the interference cell.

When there is resource overlap between the reference signal of the serving cell and the signal of the external base station device, the processor may generate the second signal, based on the overlapping resource information.

For example, the processor may generate the second signal including information about a symbol in the time-frequency domain, which is allocated to both the reference signal of the serving cell and the signal of the external base station device.

The processor may transmit the second signal to a UE in operation S950.

The processor may accurately inform the UE of the occurrence region of interference in the reference signal in the time-frequency domain by transmitting, to the UE, the second signal including the overlapping resource information regarding the reference signal of the serving cell and the signal of the external base station device. According to an example embodiment, the UE that has received the second signal may obtain the overlapping resource information regarding the reference signal of the serving cell and the signal of the external base station device and perform interference measurement using only an overlapping reference signal based on the overlapping resource information, thereby performing an efficient interference removal process.

According to an example embodiment, a base station device may transmit, to a UE, overlapping resource information regarding a reference signal in a wireless communication system, and accordingly, excessive overhead may be prevented, and the influence of an interference cell of an external base station device on the UE may be alleviated.

While the disclosure has been particularly shown and described with reference to embodiments thereof, it will be understood that various changes in form and details may be made therein without departing from the spirit and scope of the following claims.

What is claimed is:

1. A base station device comprising:

a communication circuit configured to:

receive a first signal from an external base station device, and transmit a second signal to a user equipment, by using a plurality of antennas; and a processor configured to:

obtain resource allocation information of the external base station device based on the first signal, identify, based on the resource allocation information of the external base station device, whether an interference cell is present, and generate the second signal based on identifying that the interference cell is present, the second signal comprising resource allocation information of the interference cell, wherein the processor is further configured to generate the second signal, based on at least one of:

resource allocation information of a physical downlink shared channel (PDSCH) of the interference cell overlapping a signal of a serving cell, resource allocation information of a synchronization signal block (SSB) signal of the interference cell overlapping the signal of the serving cell, and resource allocation information of a channel state information-reference signal (CSI-RS) of the interference cell overlapping the signal of the serving cell.

2. The base station device of claim 1, wherein the processor is further configured to:

identify whether a rate of overlap between a first resource allocated to the interference cell and a second resource allocated to a serving cell of the base station device is greater than or equal to a threshold value, based on resource allocation information of the serving cell; and transmit the second signal to the user equipment when the rate of overlap between the first resource and the second resource is greater than or equal to the threshold value.

3. The base station device of claim 1, wherein the processor is further configured to receive the first signal comprising the resource allocation information of the interference cell of the external base station device by using a backhaul link between the base station device and the external base station device.

4. The base station device of claim 1,
wherein the resource allocation information regarding the PDSCH of the interference cell comprises information about a slot offset of the PDSCH of the interference cell, a length of a symbol, a resource allocation type, a resource block group (RBG) size, and a frequency domain resource assignment bitmap.

5. The base station device of claim 1,
wherein the resource allocation information regarding the SSB signal of the interference cell comprises information about periodicity of the SSB signal of the interference cell, a bitmap in a half frame, a frequency band used by the SSB signal based on an absolute frequency, and a subcarrier spacing.

6. The base station device of claim 1,
wherein the resource allocation information regarding the CSI-RS of the interference cell comprises information about a slot offset of the CSI-RS of the interference cell, a start symbol and length, a start resource block and length, a code division multiplexing mode, and a frequency bitmap.

7. The base station device of claim 1, wherein the processor is further configured to generate the second signal by including the resource allocation information of the interference cell in radio resource control (RRC) or downlink control information (DCI).

8. An operating method of a base station device, the operating method comprising:
receiving a first signal from an external base station device by using a plurality of antennas;
obtaining resource allocation information of the external base station device based on the first signal;
identifying, based on the resource allocation information of the external base station device, whether an interference cell is present;
generating a second signal based on identifying that the interference cell is present, the second signal comprising resource allocation information of the interference cell and
transmitting the second signal to a user equipment,
wherein the second signal is generated based on at least one of:
resource allocation information of a physical downlink shared channel (PDSCH) of the interference cell overlapping a signal of a serving cell,
resource allocation information of a synchronization signal block (SSB) signal of the interference cell overlapping the signal of the serving cell, and
resource allocation information of a channel state information-reference signal (CSI-RS) of the interference cell overlapping the signal of the serving cell.

9. The operating method of claim 8, further comprising:
identifying whether a rate of overlap between a first resource allocated to the interference cell and a second resource allocated to a serving cell of the base station device is greater than or equal to a threshold value, based on resource allocation information of the serving cell; and
transmitting the second signal to the user equipment when the rate of overlap between the first resource and the second resource is greater than or equal to the threshold value.

10. The operating method of claim 8, wherein the receiving of the first signal comprises receiving the first signal comprising the resource allocation information of the interference cell of the external base station device by using a backhaul link between the base station device and the external base station device.

11. The operating method of claim 8,
wherein the resource allocation information regarding the signal transmitted based on the PDSCH of the interference cell comprises information about a slot offset of the PDSCH of the interference cell, a length of a symbol, a resource allocation type, a resource block group (RBG) size, and a frequency domain resource assignment bitmap.

12. The operating method of claim 8,
wherein the resource allocation information regarding the SSB signal of the interference cell comprises information about periodicity of the SSB signal of the interference cell, a bitmap in a half frame, a frequency band used by the SSB signal based on an absolute frequency, and a subcarrier spacing.

13. The operating method of claim 8,
wherein the resource allocation information regarding the CSI-RS of the interference cell comprises information about a slot offset of the CSI-RS of the interference cell, a start symbol and length, a start resource block and length, a code division multiplexing mode, and a frequency bitmap.

14. The operating method of claim 8, wherein the generating of the second signal comprises generating the second signal by including the resource allocation information of the interference cell in radio resource control (RRC) or downlink control information (DCI).

15. A base station device comprising:
a communication circuit configured to:
receive a first signal from an external base station device, and
transmit a second signal to a user equipment, by using a plurality of antennas; and
a processor configured to:
obtain resource allocation information of the external base station device based on the first signal,
identify whether there is resource overlap between a demodulation-reference signal (DM-RS) of a serving cell of the base station device and a signal of the external base station device, and
generate the second signal based on identifying that there is the resource overlap between the DM-RS of the serving cell of the base station device and the signal of the external base station device, the second signal comprising information about an overlapping resource between the DM-RS and the signal of the external base station device,
wherein the signal of the external base station device comprises a signal transmitted from an interference cell of the external base station device, based on a physical downlink shared channel (PDSCH), and
wherein the processor is further configured to generate the second signal, based on information about a resource allocated to the DM-RS of the serving cell overlapping the PDSCH of the interference cell.

16. The base station device of claim 15, wherein the processor is further configured to receive the first signal including the resource allocation information of the external base station device by using a backhaul link between the base station device and the external base station device.

17. The base station device of claim 15, wherein the resource allocation information regarding the PDSCH comprises information about a symbol overlapping with the DM-RS in a region of the PDSCH.

18. The base station device of claim 15, wherein the processor is further configured to generate the second signal by including the information about the overlapping resource between the DM-RS and the signal of the external base station device in radio resource control (RRC) or downlink control information (DCI).

* * * * *